United States Patent

[11] 3,558,806

[72] Inventors John F. Monahan
Moorestown;
Robert A. Dischert, Burlington, N.J.

[21] Appl. No. 717,655
[22] Filed Apr. 1, 1968
[45] Patented Jan. 26, 1971
[73] Assignee RCA Corporation
a corporation of Delaware

[54] MATRIXING APPARATUS
13 Claims, 7 Drawing Figs.

[52] U.S. Cl. .......... 178/5.4
[51] Int. Cl. .......... H04n 9/52
[50] Field of Search .......... 178/5.4MAT, 5.4, 5.2A

[56] References Cited

UNITED STATES PATENTS

| | | | |
|---|---|---|---|
| 2,846,574 | 8/1958 | Schroeder | 178/5.4(MAT) |
| 2,892,884 | 6/1959 | Gibson | 178/5.4(MAT) |
| 2,877,347 | 3/1959 | Clark | 178/5.4(MAT) |
| 3,340,355 | 9/1967 | Richman | 178/5.4(MAT) |

*Primary Examiner*—Richard Murray
*Assistant Examiner*—Alfred H. Eddleman
*Attorney*—Eugene M. Whitacre

ABSTRACT: Matrixing apparatus for performing masking operations in a color television system wherein the relative amplitudes of color difference signals derived from component color signals are compared to obtain control voltages, and wherein the control voltages so obtained are selectively added to or subtracted from individual component color signals to effectively change the hue and saturation of the original color information.

Figure 1:
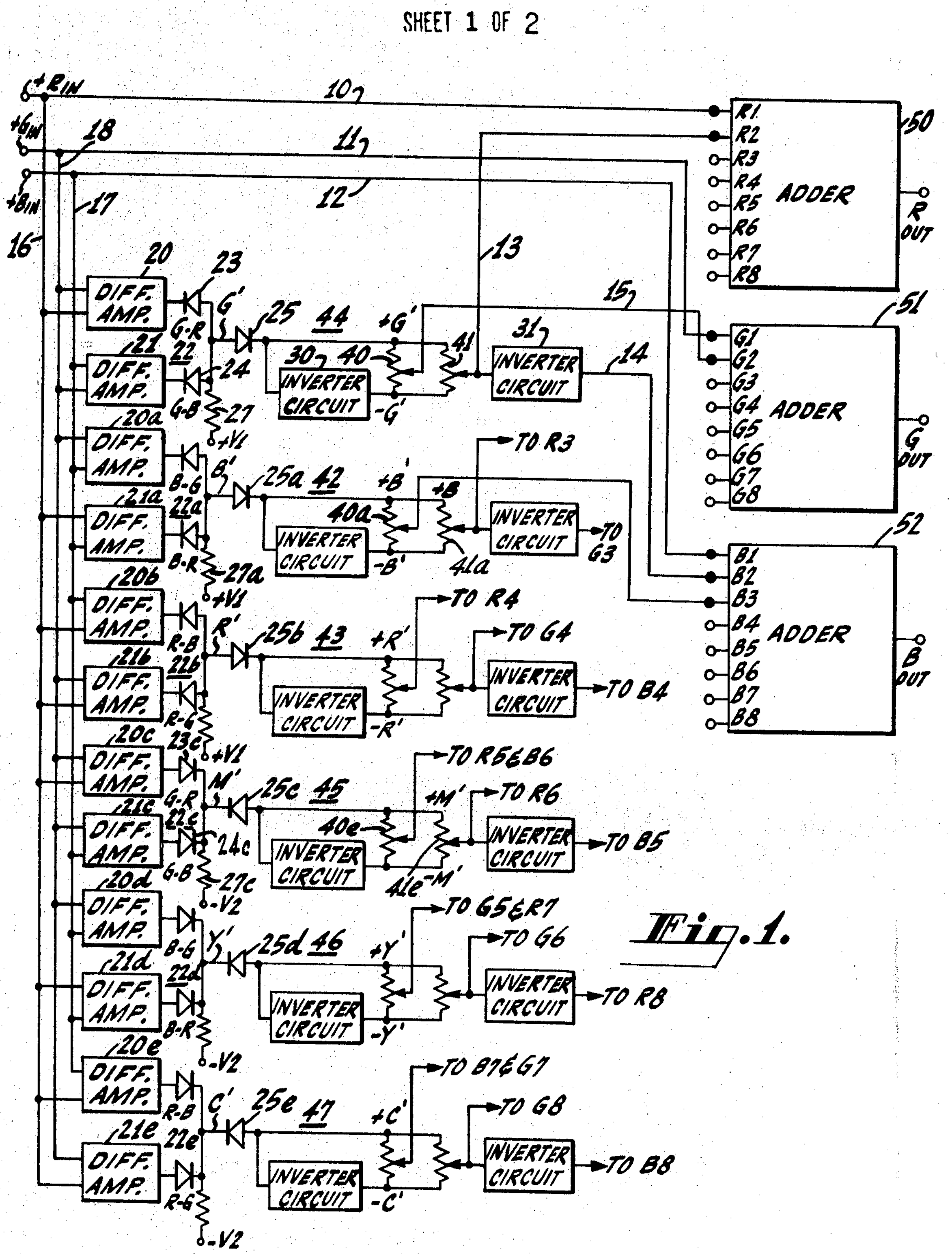

INVENTORS
JOHN F. MONAHAN &
ROBERT A. DISCHERT

BY [signature]

ATTORNEY

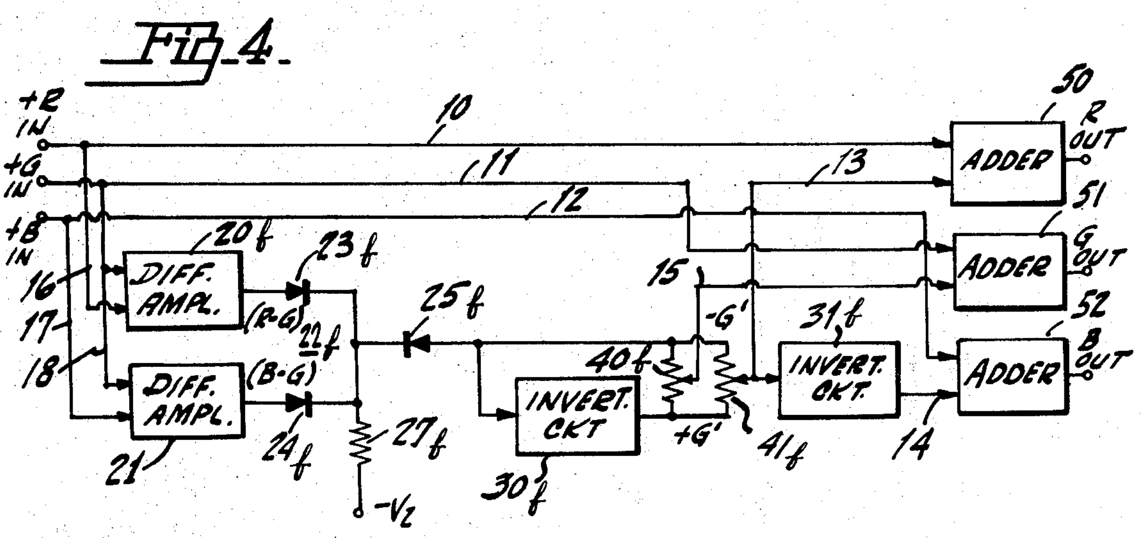
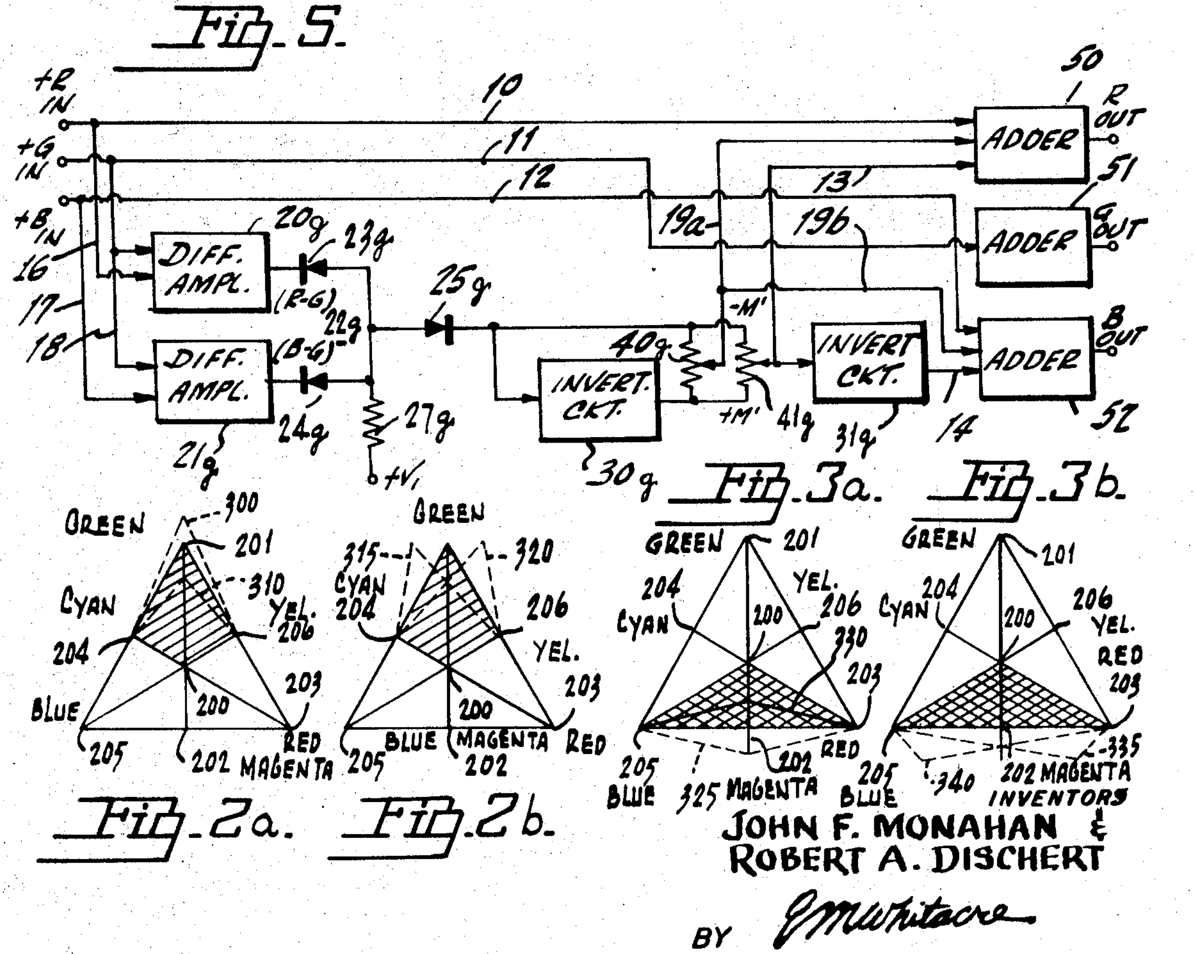
Fig. 5 Fig. 3a. Fig. 3b. Fig. 2a. Fig. 2b.
INVENTORS
JOHN F. MONAHAN &
ROBERT A. DISCHERT
BY [signature]
ATTORNEY

MATRIXING APPARATUS

This invention relates to matrixing apparatus, in general, and to matrixing apparatus of the so-called masking amplifier type, in particular.

In color television systems, it is often desirable to provide apparatus for effecting controlled mixing of the component color signals representative of the different color aspects of an image. For example, the signal specifications adopted by the FCC as color television broadcast standards call for the formation of various signals which are linear mixtures of respective component color signals in predetermined proportions and polarities. More specifically, such mixture signals include so-called I and Q signals which correspond respectively to the following mixtures:

$$.60E_R-.28E_G-.32E_B;\text{ and }.21E_R-.52E_G+.31E_B$$

where $E_R$, $E_G$ and $E_B$ are the gamma-corrected voltages corresponding to the red, green and blue signals intended for the color picture tube. The aforementioned signal specifications also call for the formation of a so-called Y signal, the monochrome portion of the color picture signal, which corresponds to the following mixture of component color signals:

$$.30E_R+.59E_G+.11E_B$$

To permit formation of these I, Q and Y signals from appropriate red, green and blue signals, apparatus must be provided which is capable of linearly combining the respective component color signals with appropriate polarities and relative amplitudes. Such mixture signal forming is generally known as matrixing, and amplifying apparatus providing such operation is generally referred to as a matrixing amplifier.

The present invention is concerned with apparatus of the matrixing amplifier type. In particular, embodiments of the invention provide matrixing amplifiers which have significant advantages in use for performing "masking" operations in a color television system. While the term "masking" has a well-known meaning in the color photography art and has a more or less analogous meaning in the color television art, it may be advantageous to briefly explain its function in a color television system.

In any color television system there are two basic terminal operations: the derivation of color information from an image by appropriate pickup apparatus, and the reproduction of that image from the color information by suitable image reproducing apparatus. The pickup operation generally requires the analysis of light from the image into specific component colors, while the image reproducing operation generally requires reproduction in specific component colors, which are combined in one manner or another to duplicate the appearance of the original image to a viewer. It may well be appreciated that if the information supplied to the image reproducer is in terms of component colors other than those which the reproducer employs to reconstruct the image, a faithful reproduction of the original image will not be achieved. Thus, if the primary colors in which the pickup apparatus analyzes light from the subject image do not correspond to the primary colors in which the reproducer establishes component images, the system must provide means for converting the originally derived color information into terms of the reproducer primaries if faithful reproductions are to be had. This conversion may be effected by a suitable mixing of the signals originally derived to provide mixture signals which substantially correspond to the reproducer primaries, i.e., the information contained in the respective mixture signals corresponds substantially to the information which would have been obtained had the pickup analysis of light from the image been originally in terms of the reproducer primaries. This effective shifting of "taking" primaries is referred to as "masking", in analogy to the masking steps used in color photography for similar primary shifting purposes. The apparatus employed to effect this electronic masking is referred to as a masking amplifier.

In accordance with embodiments of the present invention, apparatus in the form of masking amplifiers is provided for linearly mixing component color signals in desired proportions and with appropriate polarities such that mixture adjustments may be effected with optimum convenience. More specifically, improved masking amplifiers are provided which are always "white balanced", irrespective of component color signal proportion adjustments. In this regard, it should be noted that where these amplifiers are used to alter a set of component color signals, it is necessary that their respective output signals be balanced for signals representative of white or "gray" shadings. That is, when light from the subject image corresponds in color to the color determined as "white" for the system, each of the respective signal outputs of the masking amplifier must be substantially equal. In "white balanced" masking amplifiers known in the prior art, however, the adjustment of one input signal component to obtain a particular mixture signal output inherently and undesirably caused adjustments in the remaining applied signal components to upset the wanted mixture signal output. For example, consonant with an adjustment designed to add to the red signal component of a color television signal was an addition of an unwanted component into the blue and green signal channels of the masking amplifier, as well. In accordance with the present invention, however, independence of adjustment is maintained, and adjustment operations designed to change one color component affect that color component only.

A "white balanced" masking amplifier embodying the invention operates upon each component color input signal in such a manner as to provide a pair of color-difference signals. The relative amplitudes of these signals are compared to obtain control voltages indicative of the predominant color of the original information, which may then be selectively added to or subtracted from individual component color input signals to effectively change the hue and saturation of the information. The operation is such that when the input signals are representative of white or gray shadings, the color-difference signals disappear, and the selective matrix settings thus have no effect on the "white balance" of the masking amplifier output signals. Due to the nature of the masking amplifier apparatus, whereby masking is effected through the combination of color-difference signal produced control signals with a straight-through signal, a significant improvement in the noise component of the amplifier output signal is achieved since no correction is added until a color is present, there being no noise added in the absence of color.

Other advantages of the present invention may be readily ascertained by those skilled in the art upon a reading of the following detailed description and an inspection of the drawings in which:

FIG. 1 is a block diagram illustrating a representative matrixing apparatus constructed in accordance with the present invention;

FIGS. *2a* and *2b* are Maxwell trichromatic diagrams helpful in understanding the operation of the matrixing apparatus of FIG. 1;

FIGS. *3a* and *3b* are Maxwell trichromatic diagrams helpful in understanding the operation of the matrixing apparatus of FIG. 1; and FIGS. 4 and 5 are block diagrams illustrating modifications of the matrixing apparatus of FIGS. 1 and 3, respectively.

Referring to FIG. 1, a portion of matrixing apparatus in accordance with an embodiment of the present invention is illustrated, the matrixing apparatus particularly serving masking purposes of the aforementioned saturation-adjust, hue-adjust type.

For purposes of simplification of the drawing, it has been assumed that the masking amplifier of FIG. 1 operates in a color television system provided with a source of respective red, green and blue component color signals of a color television camera of a well-known type, such as the three-tube color camera. It has also been assumed that there is associated with the color signal source apparatus to provide each component color signal in the same polarity, "plus" for the purpose of this description. Thus, in the drawing, a number of signal input terminals have been indicated, each labeled with a letter and "-plus" polarity sign to represent the particular component color signal supplied to that input terminal and the relative polarity thereof. In particular, three input terminals $+R_{IN}$, $+G_{IN}$ and $+B_{IN}$ are provided. A coupling link 10 connects the $+R_{IN}$ terminal to an adder 50, while coupling links 11 and 12 similarly connect the $+G_{IN}$ and $+B_{IN}$ terminals to included adders 51 and 52, respectively. As will become clear hereinbelow, the adders 50, 51 and 52, besides receiving the $+R_{IN}$, $+G_{IN}$ and $+B_{IN}$ component color signals, additionally receive control voltages by means of several other coupling links such as the links 13, 14 and 15 to adjust the hue and saturation of a supplied color signal in a predetermined manner. The adjusted signal output of the adders 50, 51 and 52 respectively appear at the three output terminals $R_{OUT}$, $G_{OUT}$, and $B_{OUT}$.

The matrixing amplifier of FIG. 1 also includes six pairs difference amplifiers 20 and 21; 20*a* and 21*a*; 20*b* and 21*b*; etc. Each pair of the difference amplifiers drives a nonadditive mixer circuit 22, 22*a*, 22*b*, etc. Conductors 16, 17 and 18 respectively connect the $+R_{IN}$, $+B_{IN}$ and $+G_{IN}$ input terminals to the various difference amplifiers.

The circuit for providing correction of the green signal includes the difference amplifiers 20 and 21. The conductor 18 connects the $G_{IN}$ input terminal to both of the difference amplifiers 20 and 21. The conductor 17 connects the $B_{IN}$ input terminal to the difference amplifier 21 and the conductor 16 connects the $R_{IN}$ input terminal to the difference amplifier 20. The amplifier 20 is connected to provide a G-R color difference signal at its output terminal which is then coupled to the cathode electrode of a rectifier 23 in the circuit 22. The amplifier 21 is similarly arranged to provide a G-B color difference signal at its output terminal, which is then coupled to the cathode electrode of a second rectifier 24 of the circuit 22.

A coupling rectifier 25, a pair of inverter circuits 30 and 31, and a pair of potentiometers 40 and 41 are further included in the matrix amplifier. The rectifier 25 has its anode electrode commonly connected to the anode electrodes of the rectifiers 23 and 24, and, by means of the resistor 27 of the circuit 22, to a source of positive potential $+V_1$. Its cathode electrode is, as shown, directly connected to one terminal of the potentiometers 40 and 41 (indicated by the reference notation $+G'$) and, by way of the inverter circuit 30, to the other terminal of those potentiometers (indicated by the notation $-G'$). The adjustable tap of the potentiometer 40, furthermore, is shown connected to the adder 51 via the coupling link 15, while the corresponding tap of the potentiometer 41 is connected via the link 13 to the adder 50 and by means of the inverter circuit 31 and the coupling link 14 to the adder 52.

It may be appreciated from the foregoing that the structure of the blue and red signal channels 42 and 43 of the matrixing amplifier will be analogous to the green signal channel structure described above, but with the difference amplifiers 20*a* and 21*a* arranged to provide B-G and B-R color difference signals in the first instance and with the amplifiers 20*b* and 21*b* arranged to provide R-G and R-B color difference signals in the second instance. Additionally, in the blue signal channel case, the coupling link from the tap or slider of the potentiometer 40*a* is connected to the adder 50 while the coupling links from the tap or slider of the potentiometer 41*a* is connected to the adders 51 and 52, respectively. The red signal channel 42 is similarly connected as is shown.

To appreciate the significant advantages of the present invention, an analysis of the Maxwell trichromatic diagrams of FIG. 2 may be made. These diagrams show the three primary colors red, green and blue at the apexes of a triangle. Nearly any hue and saturation may be represented by a point within this triangle. Neutral is represented by the central point 200 at which the three bisecting lines meet. The color along the line 201—200 drawn from the green apex to the neutral point has the pure green hue but has a saturation which decreases from a maximum at point 201 to zero at 200. Progression along the line 201—200 therefore represents the admixture to green of red and blue in exactly equal amounts, or of varying amounts of green. Admixture of red and blue in unequal amounts is represented by progression along some other line, and constitutes a change of hue. Extension of the line 201—200 ultimately bisects the blue-red baseline of the trichromatic triangle at a point 202, corresponding to the complementary color magenta which comprises essentially equal amounts of the pure red and blue hues. The line 203—200—204 correspondingly drawn from the red apex through the neutral point to the blue-green line of the Maxwell triangle intersects that latter line at the complementary color cyan which comprises essentially equal amounts of the pure green and blue hues. Similarly, the line 205—200—206 drawn from the blue apex through the neutral point to the red-green line of the triangle intersects that line at the complementary color yellow.

A color image which is predominantly green may be represented by the shaded areas of FIGS. 2*a* and 2*b*. The signal information representing such an image causes a voltage to be developed at the anode of the rectifier 25 which is sufficiently positive to be passed by that rectifier. The voltages at the anodes of rectifiers 25*a* and 25*b* and at the cathodes of rectifiers 25*c*–25*e* is not of a value to forward bias these rectifiers.

The nonadditive mixer circuit 22 selects the most negative (least positive) of the G-R and G-B color difference signals developed by the amplifiers 20 and 21, and if the resultant is positive, the signal voltage $G'$ coupled through rectifier 25 must fall in the predominantly green area of the Maxwell triangle.

Having determined, in this manner, that the signal voltage $G'$ for the situation illustrated in FIG. 2 is indeed indicative of green, $G'$ is then used to alter the $R_{IN}$, $G_{IN}$ and $B_{IN}$ signals. More particularly, with $+G'$ present at one terminal of the potentiometers 40 and 41, and with $-G'$ present at the other terminal of these potentiometers due to the action of the inverter circuit 30, adjustment of the slider of the potentiometers 40 and 41 can change the saturation and/or hue of the resulting color signal. Thus, it will be seen that by maintaining the potentiometer 41 slider at its center position, a change in position of the potentiometer 40 slider in one direction will add a $+G'$ voltage via the coupling link 15 to the $+G_{IN}$ signal coupled to the adder 51 along the link 11, while a positional change in the opposite direction will add a $-C'$ voltage to the $+G_{IN}$ signal. Since equal (in this case, zero) $G'$ voltages will be coupled to the adders 50 and 52 by means of the potentiometer 41 and the coupling links 13 and 14 at this time, the overall effect will be to change the saturation of the green color content without affecting the overall hue of a subsequently reproduced image. The effect of such potentiometer 40 slider adjustment is indicated in FIG. 2*a* where the addition of $G'$ voltage to the $+G_{IN}$ signal would result in a stretching of the green section of the Maxwell triangle (the dashed lines 300) while the addition of $-G'$ voltage to the $+G_{IN}$ signal would result in a depressing of the green section (the dashed lines 310).

To change the hue of the subsequently reproduced color image, the potentiometer 40 slider is set at its center position while the potentiometer 41 slider is adjusted on either side of its center position as desired. For example, adjusting the potentiometer 41 slider towards the terminal at which the $+G'$ voltage appears couples a positive voltage via the link 13 to the adder 50 along with the $+R_{IN}$ color signal coupled thereto by the link 10. At the same time, the inverter circuit 31 reverses the polarity of the positive voltage developed at the potentiometer slider 41 so that the link 14 couples a negative voltage to the adder 52 along with the $+B_{IN}$ color signal coupled thereto by the link 12. The effect of adjusting the potentiometer 41 slider in this manner would thus be to add a positive voltage to the $+R_{IN}$ signal and to subtract a positive voltage from the $+B_{IN}$ signal, thereby shifting the peak of the green section of the trichromatic triangle of FIG. 2*b* to the right (the dashed lines 320). Conversely, adjusting the potentiometer 41 slider from its center position toward the terminal at which the $-G'$ voltage appears has the effect of adding a negative voltage to the $+R_{IN}$ signal at the adder 50 and adding a positive voltage to the $+B_{IN}$ signal at the adder 52. The result is to shift the peak of the green section of the trichromatic triangle of FIG. 2*b* to the left (the dashed lines 315), as shown.

It will be apparent that similar control can be obtained with the red and blue primary colors in the circuits 43 and 42. Thus, where the most negative (or least positive) of the R-G and R-B color difference signals is of positive polarity, the supplied color information is predominantly red and an R' control voltage will be available to change the saturation of the red component color and the hue of the overall reproduced image, and no control voltage will be developed by the other color channels 42 and 44—47. Similarly, where the most negative (or least positive) of the B-R and B-G color difference signals is positive, the supplied color information is predominantly blue, and a B' control voltage will be available to change the saturation of the blue component color and the hue of the image, and no control voltage will be developed by the other color channels 43—47.

The masking amplifier also operates on the complementary magenta, cyan and yellow signals. The differential amplifiers 20*c* and 21*c* provide (G-R) and (G-B) color difference signals to the nonadditive mixer circuit 22*c*. The circuit 22*c* comprises the rectifiers 23*c* and 24*c* and the resistor 27*c* connecting to a source of negative potential $-V_2$. It will be noted that the poling of the rectifiers 23*c*, 24*c* and 25*c* is reversed as compared to the rectifiers 23, 24 and 25. In addition, it will be seen that the magenta saturation control potentiometer 40*e* is coupled to both the adders 50 and 52. Opposite polarities of the magenta hue control potentiometer 41*c* are connected to the adders 50 and 52.

As will be apparent from the Maxwell trichromatic color triangles of FIGS. 3*a* and 3*b*, a supplied color signal will be predominantly magenta if the most positive (or least negative) of the G-R and G-B color-difference signal quantities is negative. This situation exists when the negative signal voltage resultant M' coupled through the rectifier 25*e* falls within the cross-hatched areas of the color triangles. The control of the saturation of the resulting color signal is accomplished by adjusting the potentiometer 40*e* slider so as to add (or subtract) equal portions of the M' control voltage to the $+R_{IN}$ and $+B_{IN}$ signals coupled to the adders 50 and 52 and by setting the potentiometer 41*c* slider at its center position. The control of its hue is accomplished in exactly the same way as with the green signal; namely, the potentiometer 41*c* slider is adjusted to add (or subtract) a portion of the M' resultant to the $+R_{IN}$ signal coupled to the adder 50 while at the same time subtracting (or adding) a like control voltage to the $+B_{IN}$ signal coupled to the adder 52. The effect of adjusting the potentiometer 40*c* slider is shown in FIG. 4*a* where increase and decrease of saturation is indicated by the stretching (dashed lines 325) and depressing (dashed lines 330) of the cross-hatched magenta section, respectively. The effect of adjusting the potentiometer 41*c* slider at an increased saturation is shown in FIG. 4*b* where the dashed lines 335 indicate the addition of a portion of the M' control voltage to the $+R_{IN}$ signal and a like subtraction of that control voltage from the $+B_{IN}$ signal, and where the dashed lines 340 indicate the subtraction of a portion of the M' voltage from the $+R_{IN}$ signal and a similar addition of that voltage to the $+B_{IN}$ signal.

It will also be apparent that analogous control can be obtained for the cyan and yellow complementary colors in the channels 46 and 47. Thus, where the most positive (or least negative) of the R-G and R-B color difference signals is of negative polarity, the supplied color information is predominantly cyan and a C' negative control voltage will be available in the channel 47 to change the saturation of the resulting color signal and the hue of the overall reproduced image. Similarly, where the most positive (or least negative) of the B-R and B-G color difference signals is negative, the supplied color information is predominantly yellow, and a Y' negative control voltage will be available in the channel to change the saturation of the color signal and the hue of the image.

FIGS. 4 and 5 show masking amplifier configurations which are modifications respectively of the red-green-blue and magenta-yellow-cyan amplifiers shown in FIG. 1. More particularly, the difference amplifiers 20 and 21, the nonadditive mixer circuit 22 and the coupling rectifier 25 of FIG. 1 are modified in FIG. 4 to provide a voltage indication of a predominantly green scene at the anode of the rectifier 25*f* when the most positive (or least negative) of the R-G and B-G color-difference signals there developed is negative. Similarly, the difference amplifiers 20*c* and 21*c*, the circuit 22*c* and the coupling rectifier 25*c* of FIG. 1 are modified in FIG. 5 to provide a voltage indication of a predominantly magenta scene at the cathode of the rectifier 25 when the most negative (or least positive) of the R-G and B-G difference signals there developed is positive. (In this regard, reference should be had to FIGS. 4 and 5 where the same symbol notations are employed as in the previous drawings though the signals shown are indicated as being of opposite polarity.) In a manner analogous to that mentioned above, in addition, the form of masking amplifier shown in FIG. 4 can also be employed with the red and blue primary colors, while the form of amplifier shown in FIG. 5 can be employed with the cyan and yellow complementary colors.

It should be noted from the foregoing discussion, that all signal processing is done using color difference signals—G-R, G-B, etc. Signal processing in this way provides the advantage of preserving "white balance" since for white or "gray" shadings thereof, the red, green and blue color signals will be equal and the color difference signals will all equal zero. A second advantage of this type of processing follows from the fact that since saturation and/or hue correction is available only when a color is present, no signal is added and hence no noise is added through any of the various channels 42—47 except through the channel of the predominant color. At most, two of the channels 42—47 add correction information to the $R_{IN}$, $B_{IN}$ and $G_{IN}$ signals at any one time. Thirdly, another advantage follows from the fact that the noise added to a color signal contains contributions only from two signal sources, i.e., the two color-difference signals employed, rather than from three signal sources which would be the case where each of the primary (or complementary) colors are employed to adjust saturation or hue.

One application to which the masking amplifier of the present invention has been put is to improve the colorimetry of a studio color camera chain. If it was there determined, for example, that the color camera had poor red response, the fidelity of the final presentation could be improved by increasing the red saturation in a manner similar to that heretofore described. To correct the bluish appearance of a magenta object viewed with such a color camera, the magenta hue control could also be adjusted to boost the level of the red information, as described.

We claim:

1. In a color television system provided with a plurality of simultaneous primary color signal components matrixing apparatus comprising:

means for applying said primary color signal components to said matrixing apparatus;

means for combining a first one of said color signal components with a second one of said color signal components;

means for combining said first color signal component with a third one of said color signal components;

means responsive to the amplitude and polarity of the outputs of each of said first-named and second-named signal combining means for providing a voltage indicative of the amplitude of the one of said first, second and third primary color signal components and of their complementary color signal components which is predominant in a televised scene when the outputs of said first and second-named combining means are of the same predetermined polarity;

means coupled to said last-mentioned means for adjusting at least one of the amplitude and polarity of said indicative voltage and for providing an output voltage suitable for color control;

adder circuit means; and means for coupling the output of said adjusting means and one of said primary color signal components to said adder circuit means.

2. Matrixing apparatus as defined in claim 1 wherein said first and second-named combining means each include means for respectively reversing the polarity of said second and third primary color signal components applied thereto with respect to the polarity of said applied first primary color signal component, to provide first and second color difference signals of nominally differing amplitudes.

3. Matrixing apparatus as defined in claim 1 wherein said adjusting means includes means for providing first, second and third control voltages, wherein said adder circuit means includes first, second and third adder circuits having a common output terminal, and wherein said coupling means couples individual ones of said control voltages to selected adder circuits along with selected primary color signal components, as desired, to establish at least one of the hue and saturation of the televised scene represented by the combined color signal components developed at said common output terminal.

4. In a color television system provided with a plurality of simultaneous red, green and blue primary color signal components, matrixing apparatus comprising:

means for applying said primary color signal components to said matrixing apparatus;

means for combining a first one of said color signal components with a second one of said color signal components for providing a first color difference signal;

means for combining said first color signal component with a third one of said color signal components for providing a second color difference signal, said first and second color difference signals being of nominally different amplitudes and of the form X-Y and X-Z;

means responsive to the amplitude of the outputs of each of said first-named and second-named signal combining means for providing a voltage indicative of the amplitude of the one of said first, second and third primary color signal components which is predominant in a televised scene when the most negative of said X-Y and X-Z signal amplitudes is of positive polarity;

means coupled to said last-mentioned means for adjusting at least one of the amplitude and polarity of said indicative voltage and for providing an output voltage suitable for color control;

adder circuit means; and means for coupling the output of said adjusting means and one of said primary color signal components to said adder circuit means.

5. Matrixing apparatus as defined in claim 4 wherein said adjusting means includes means for providing a first control voltage in response to said predominant primary color voltage indication, wherein said adder circuit means includes first, second and third adder circuits having a common output terminal, and wherein said coupling means includes means for coupling the less predominant two of said primary color signal components to said first and second adder circuits, respectively, and means for coupling said first control voltage and the predominant one of said red, green and blue primary color signal components to said third adder circuit, to establish the saturation of the televised scene represented by the combined color signal components developed at said common output terminal.

6. Matrixing apparatus as defined in claim 4 wherein said adjusting means includes means for providing first and second control voltages in response to said predominant primary color voltage indication, wherein said adder circuit means includes first, second and third adder circuits having a common output terminal, and wherein said coupling means includes means for coupling the less predominant two of said primary color signal components to said first and second adder circuits, respectively, means for respectively coupling said first and second control voltages to said first and second adder circuits and means for coupling the predominant one of said red, green and blue primary color signal components to said third adder circuit, to establish the hue of the televised scene represented by the combined color signal components developed at said common output terminal.

7. Matrixing apparatus as defined in claim 5 wherein said adjusting means also includes means for providing second and third control voltages in response to said predominant primary color voltage indication, and wherein said coupling means also includes means for coupling said second and third control voltages to said first and second adder circuits, respectively, to cooperate with the less predominant primary color signal components coupled thereto to additionally establish the hue of the televised scene represented by the combined color signal components developed at said common output terminal.

8. In a color television system provided with a plurality of simultaneous red, green and blue primary color signal components respectively having cyan, magenta and yellow complementary color signal components, matrixing apparatus comprising:

means for applying said primary and complementary color signal components to said matrixing apparatus;

means for combining a first one of said color signal components with a second one of said color signal components for providing a first color difference signal;

means for combining said first color signal component with a third one of said one of said color signal components for providing a second color difference signal, said first and second color difference signals being of nominally different amplitudes and of the form X-Y and X-Z, respectively;

means responsive to the amplitude of the outputs of each of said first-named and second-named signal combining means for providing a voltage indicative of the amplitude of the one of said complementary color signal components which is predominant in a televised scene when the most positive of said X-Y and X-Z signal amplitudes is of negative polarity;

means coupled to said last-mentioned means for adjusting at least one of the amplitude and polarity of said indicative voltage and for providing an output voltage suitable for color control;

adder circuit means; and means for coupling the output of said adjusting means and one of said primary color signal components to said adder circuit means.

9. Matrixing apparatus as defined in claim 8 wherein said adjusting means includes means for providing a first control voltage in response to said predominant complementary color voltage indication, wherein said adder circuit means includes first, second and third adder circuits having a common output terminal, and wherein said coupling means includes means for coupling the two of said primary color signal components which taken together form the hue of the predominant one of said cyan, magenta and yellow complementary color signal components to said first and second adder circuits, respectively, means for coupling said first control voltage to said first and second adder circuits, and means for coupling the third of said mentioned primary color signal components to said third adder circuit to establish the saturation of the televised scene represented by the combined color signal components developed at said common output terminal.

10. Matrixing apparatus as defined in claim 8 wherein said adjusting signal components includes means for providing first and second control voltages in response to said predominant complementary color voltage indication, wherein said adder circuit means includes first, second and third adder circuits having a common output terminal, and wherein said coupling means includes means for coupling the two of said primary color signal components which taken together form the hue of predominant one of said cyan, magenta and yellow complementary color signal components to said first and second adder circuits, respectively, means for respectively coupling said first and second control voltages to said first and second adder circuits, and means for coupling the third of said-mentioned primary color signal components to said third adder circuit to establish the hue of the televised scene represented by the combined color signal components developed at said common output terminal.

11. Matrixing apparatus as defined in claim 9 wherein said adjusting means also includes means for providing second and third control voltages in response to said predominant complementary color voltage indication, and wherein said coupling means also includes means for coupling said second and third control voltages to said first and second adder circuits, respectively, to cooperate with the primary color signal components coupled thereto to additionally establish the hue of the televised scene represented by the combined color signal components developed at said common output terminal.

12. In a color television system provided with a plurality of simultaneous red, green and blue primary color signal components, matrixing apparatus comprising:

means for applying said primary color signal components to said matrixing apparatus;

means for combining a first one of said color signal components with a second one of said color signal components for providing a first color difference signal;

means for combining said first color signal component with a third one of said color signal components for providing a second color difference signal, said first and second color difference signals being of nominally different amplitudes and being of the form X-Y and X-Z, respectively;

means responsive to the amplitude of the outputs of each of said first-named and second-named signal combining means for providing a voltage indicative of the amplitude of the one of said primary color signal components which is predominant in a televised scene when the most positive of said X-Y and X-Z signal amplitudes is of negative polarity;

means coupled to said last-mentioned means for adjusting at least one of the amplitude and polarity of said indicative voltage and for providing an output voltage suitable for color control;

adder circuit means; and means for coupling the output of said adjusting means and one of said primary color signal components to said adder circuit means.

13. In a color television system provided with a plurality of simultaneous red, green and blue primary color signal components respectively having cyan, magenta, and yellow complementary color signal components, matrixing apparatus comprising:

means for applying said color signal components to said matrixing apparatus;

means for combining a first one of said color signal components with a second one of said color signal components for providing a first color difference signal;

means for combining said first color signal component with a third one of said color signal components for providing a second color difference signal, said first and second color difference signals being of nominally differing amplitudes and of the form X-Y and X-Z, respectively;

means responsive to the amplitude of the outputs of each of said first-named and second-named signal combining means for providing a voltage indicating of the amplitude of the one of said complementary color signal components which is predominant in a televised scene when the most negative of said X-Y and X-Z signal amplitudes is of positive polarity;

means coupled to said last mentioned means for adjusting at least one of the amplitude and polarity of said indicative voltage and for providing an output voltage suitable for color control;

adder circuit means; and means for coupling the output of said adjusting means and one of said primary color signal components to said adder circuit means.

UNITED STATES PATENT OFFICE

CERTIFICATE OF CORRECTION

Patent No. 3,558,806 Dated January 26, 1971

Inventor(s) John F. Monahan & Robert A. Dischert

It is certified that error appears in the above-identified patent and that said Letters Patent are hereby corrected as shown below:

Column 4, line 45, that portion reading "-C'" should read -- -G' --.
Column 8, line 70, that portion reading "signal components" should read -- means --.
Column 10, line 27, that portion reading "indicating" should read -- indicative --.

Signed and sealed this 27th day of April 1971.

(SEAL)
Attest:

EDWARD M.FLETCHER,JR.
Attesting Officer

WILLIAM E. SCHUYLER, JR
Commissioner of Patents